Feb. 3, 1931.  J. YUYAMA  1,791,395

SYNCHRONIZING APPARATUS

Filed March 27, 1929

Inventor:
Juji Yuyama
by Charles E. Tullar
His Attorney

UNITED STATES PATENT OFFICE

JUJI YUYAMA, OF EBARAGUN, TOKYOFU, JAPAN, ASSIGNOR TO GENERAL ELECTRIC COMPANY, A CORPORATION OF NEW YORK

SYNCHRONIZING APPARATUS

Application filed March 27, 1929, Serial No. 350,378, and in Japan July 24, 1928.

My invention relates to improvements in synchronizing apparatus and has for an object to provide an improved arrangement for controlling the connection of two alternating current circuits when their electromotive forces are in synchronism.

My invention will be better understood from the following description when considered in connection with the accompanying drawing and its scope will be pointed out in the appended claims.

Figure 1:
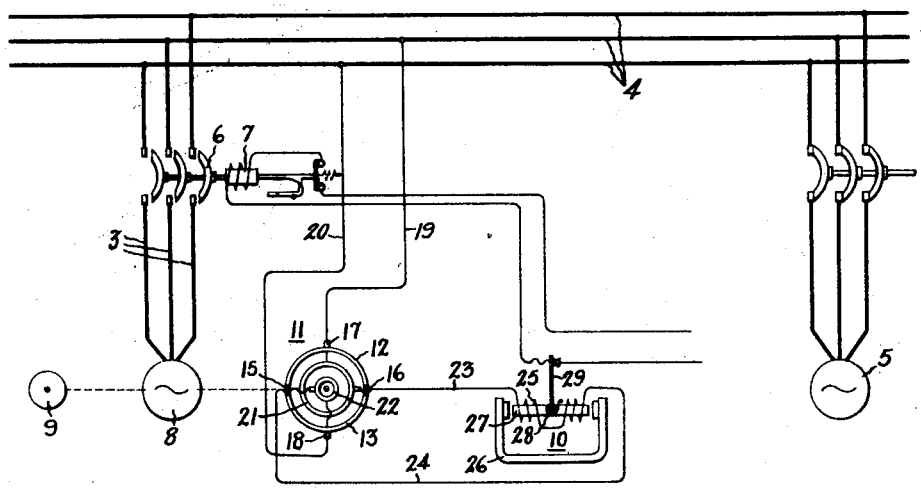
Figure 2:
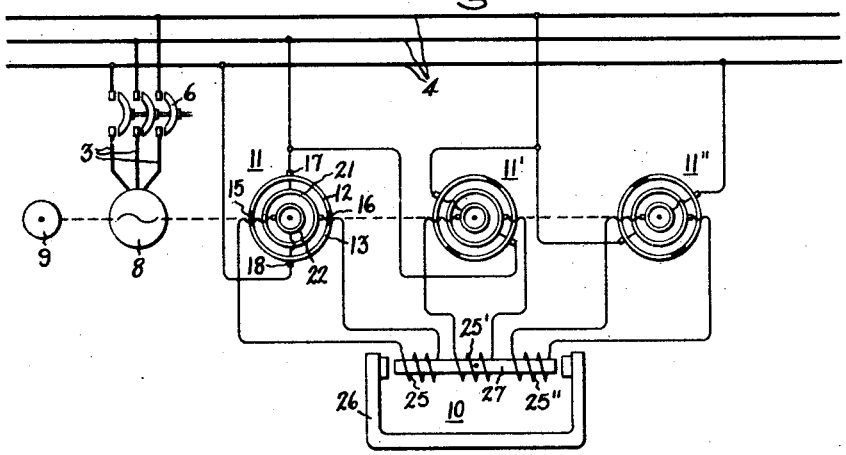

In the accompanying drawing, Fig. 1 illustrates diagrammatically a synchronizing arrangement embodying my invention and Fig. 2 illustrates diagrammatically a modification of my invention.

In the embodiment of my invention shown in Fig. 1, two A.—C. circuits 3 and 4, the latter of which may be a bus arranged to be supplied by a generator 5, are provided with suitable connecting means such as a circuit breaker 6 shown as of the latched closed type and provided with a closing coil 7. The circuit 3 includes a generator 8 which is arranged to be driven by any suitable prime mover 9 and the broken line between these devices is merely indicative of the driving connection between the two.

In accordance with my invention, I provide means for controlling the closing operation of the circuit breaker 6 when the electromotive forces of the circuits 3 and 4 are in synchronism. As shown, this means includes a relay 10 and rectifying means 11 for controlling the energization of the relay in accordance with the difference between the frequencies of the circuits 3 and 4. Further, in accordance with my invention, the rectifying means 11 is arranged to be actuated in accordance with the frequency of one of the circuits and is connected to the other of the circuits and to the relay. The rectifying means 11 is of a mechanical type and is arranged to be actuated at a speed dependent on the frequency of one of the circuits, for example, the circuit 3 including the generator 8. For this purpose the rectifying means may be of any suitable type and may be coupled to the generator 8 or its prime mover 9 in any suitable manner the broken line between the generator 8 and the rectifying means 11 being indicative of this coupling.

As shown, the rectifying means 11 includes two rotatable circular conducting portions 12 and 13 which are separated by insulating portions 15 and 16 and on which bear brushes 17 and 18. These brushes are connected by leads 19 and 20 to phase conductors of the circuit 4. The rectifying means 11 further includes two rotatable ring members 21, 22 which are respectively connected to the rotating members 12 and 13 and through brushes and leads 23 and 24 to the terminals of the winding 25 of the relay 10.

In accordance with my invention, the relay 10 is of a type operative in response to current of a frequency less than a predetermined value and may be in effect a direct current type of relay. It may further be of a directional type in order to provide operation in accordance with the phase relation between the electromotive forces of the circuits 3 and 4. For the purpose of illustrating my invention, I have shown the relay 10 as of the polarized type including a permanently magnetic field member 26, and a pivoted armature 27 biased for counterclockwise rotation by suitable means indicated as a spring 28. Movable with the armature 27 is a contact controlling member 29 arranged to control contacts in the circuit of the closing coil 7. Although it is better in controlling the circuits of the closing coils of circuit breakers to have sensitive relays transmit their operation through auxiliary devices capable of handling greater currents such as circuit breaker closing coils often require, I have omitted these auxiliary devices for the sake of simplicity in illustrating my invention. Likewise, I have shown the leads 19 and 20 to the rectifying means 11 directly connected to the phase conductors of the circuit 4 although it will be understood that potential transformers or other suitable means will be interposed in this connection wherever requirements dictate.

The operation of my invention will be understood, if it is first assumed that the generator 8 is at a standstill and the rectifying means 11 is connected to the circuit 4. In this case the winding 25 of the relay 10 will be energized by an alternating current of a frequency corresponding to that of the circuit 4. The contact 29 will be biased from the circuit closing position by the spring 28 and the alternating current flowing in the winding 25 will not effect the clockwise or circuit closing movement of the armature 27. If now the generator 8 is started, then there will appear in the relay winding 25 an impulse current of a frequency corresponding to the difference between the frequencies of the electromotive forces of the circuits 3 and 4. As these frequencies become more nearly alike, the period of time over which a current of one direction flows in the relay winding 25 increases. For example, if the difference between the frequencies were one per second, the current would flow in one direction in the relay winding 25 for half a second and in the opposite direction for the other half second. While this current is of an impulse type, it approximates a direct current and when flowing in the right direction would tend to effect the circuit closing operation of the contact controlling member 29 as indicated in Fig. 1 in accordance with the predetermined frequency difference for which the relay 10 is adjusted to operate. The foregoing explanation is on the basis that the electromotive forces are substantially in phase. Of course, when they are substantially 180° out of phase, the direction of the current in the relay winding 25 will be such as to cause the torque on the armature to be in the direction of the torque exerted by the spring 28 so as to maintain the circuit of the closing coil 7 open.

If it is desired to provide the relay with a current more closely approximating a unidirectional current of uniform value, the modification of my invention shown in Fig. 2 may be employed. In this case, one or more rectifiers 11, 11', 11'' connected to the various phases of the circuit 4 may be employed. If this is done, the relay 10 may be provided with a plurality of cumulatively acting windings 25, 25', 25'' respectively connected to the rectifiers 11, 11', 11'' in the manner indicated in Fig. 1. For a three-phase circuit, the relative angular positions of the three rectifiers will, of course, correspond to the phase displacement of the voltages of the circuit. The rectifiers 11, 11', 11'' will be arranged to be driven from the generator 8 to be synchronized in any suitable manner, the broken line being indicative of the driving connection.

While I have shown and described my invention in considerable detail, I do not desire to be limited to the exact arrangement shown, but seek to cover in the appended claims all those modifications that fall within the true spirit and scope of my invention.

What I claim as new and desire to secure by Letters Patent of the United States is:

1. In combination with two alternating current circuits and connecting means therefor, means for controlling the operation of said connecting means including a relay and rectifying means connected to one of said circuits for controlling the energization of said relay in accordance with the difference between the frequencies of said circuits and means for actuating said rectifying means in accordance with the frequency of the other of said circuits.

2. In combination with two alternating current circuits and connecting means therefor, means for controlling the operation of said connecting means including a relay and rectifying means connected to one of said circuits for controlling the energization of the relay to effect the operation thereof when the difference between the circuit frequencies is less than a predetermined value and means for actuating said rectifying means at a speed dependent on the frequency of the other of said circuits.

3. In combination with two alternating current circuits and connecting means therefor, means for controlling the operation of said connecting means including a relay operative only when energized by current having a frequency less than a predetermined value and rectifying means connected to one of said circuits and to said relay for controlling the energization of said relay to effect the operation thereof when the difference between the circuit frequencies is less than a predetermined value and means for actuating said rectifying means at a speed dependent on the frequency of the other of said circuits.

4. In combination with two alternating current circuits and connecting means therefor, means for controlling the operation of said connecting means including a directional relay operative only when energized by current having a frequency less than a predetermined value and rectifying means connected to one of said circuits and to said relay for controlling the energization of said relay to effect the operation thereof when the difference between the circuit frequencies is less than a predetermined value and a predetermined phase relation exists between the electromotive forces of the circuits and means for actuating said rectifying means at a speed dependent on the frequency of the other of said circuits.

5. In combination with two alternating current circuits and connecting means therefor, means for controlling the operation of said connecting means including a polarized relay and rectifying means connected to one of said circuits and to said relay for controlling the energization of said relay in accordance with the difference between the frequencies of said circuits and means for actuating said rectifying means in accordance with the frequency of the other of said circuits.

6. In combination with two alternating current circuits and connecting means therefor, means for controlling the operation of said connecting means including a directional relay and rectifying means connected to be energized from one of said circuits for controlling the energization of said relay in accordance with the difference between the frequencies of said circuits and means for actuating said rectifying means in accordance with the frequency of the other of said circuits.

7. In combination with two alternating current circuits and connecting means therefor, means for controlling the operation of said connecting means including a directional relay and rectifying means connected to one of said circuits and to said relay for controlling the energization of said relay to effect the operation thereof when the difference between the circuit frequencies is less than a predetermined value and means for acutating the rectifying means at a speed dependent on the frequency of the other of said circuits.

In witness whereof, I have hereunto set my hand, this twenty-eighth day of February, 1929.

JUJI YUYAMA.